United States Patent [19]

Rosenberger

[11] Patent Number: 4,901,672

[45] Date of Patent: Feb. 20, 1990

[54] ANIMAL CONTAINMENT STRUCTURE

[76] Inventor: Edwin D. Rosenberger, 328 E. 5th St., Apt. 1, Brooklyn, N.Y. 11218

[21] Appl. No.: 179,045

[22] Filed: Apr. 8, 1988

[51] Int. Cl.⁴ .............................................. A01K 1/00
[52] U.S. Cl. ..................................... 119/19; 446/122; 119/20
[58] Field of Search ................... 119/17, 19, 20, 21; 446/116, 118, 122

[56] References Cited

U.S. PATENT DOCUMENTS

| | | | |
|---|---|---|---|
| 1,160,728 | 11/1915 | Liggett | 119/20 X |
| 1,695,553 | 12/1928 | Jones et al. | 446/122 X |
| 1,898,297 | 2/1933 | Fox | 446/122 |
| 2,683,329 | 7/1954 | Kobler | 446/122 |
| 3,116,847 | 1/1964 | Collins | 119/19 |
| 3,234,908 | 2/1966 | Doskocil | 119/19 |
| 3,866,577 | 2/1975 | Mathis | 119/19 |
| 4,193,584 | 3/1980 | Wieser | 119/20 |

FOREIGN PATENT DOCUMENTS

| | | | |
|---|---|---|---|
| 153677 | 12/1903 | Fed. Rep. of Germany | 446/122 |
| 1175515 | 8/1985 | U.S.S.R. | 446/122 |
| 920030 | 8/1961 | United Kingdom | 446/116 |
| 2049451 | 5/1980 | United Kingdom | 446/122 |
| 2066680 | 1/1981 | United Kingdom | 446/122 |

Primary Examiner—Robert P. Swiatek
Assistant Examiner—R. Thomas Price
Attorney, Agent, or Firm—Richard L. Miller

[57] ABSTRACT

This animal containment structure is so designed, as to be easily put together by a multiple number of cubical connectors and plugs, and panels are so designed for being readily received in rail members that receive the cubical connectors and plugs.

6 Claims, 1 Drawing Sheet

ANIMAL CONTAINMENT STRUCTURE

BACKGROUND OF THE INVENTION

The instant invention relates generally to confinement devices, and more particularly, to an animal containment structure.

Numerous animal confinement structure have been provided in the prior art that are adapted to enclose animals. For example, U.S. Pat. Nos. 3,662,713 of Sachs, 3,611,994 of Bailey, and 3,618,568 of Breeden, all are illustrative of such prior art. While these units may be suitable for the particular purpose to which they address, they would not be as suitable for the purpose of the present invention as hereafter described.

SUMMARY OF THE INVENTION

A primary object of the present invention is to provide an animal containment structure that will overcome the shortcomings of the prior art devices.

Another object is to provide an animal containment structure that will be of such design, as to be employed in clusters that are easily assembled.

An additional object is to provide an animal containment structure that will include rails, slideable connectors, plugs, and panels that may also be easily disassembled when desired.

A further object is to provide an animal containment structure that is simple and easy to use.

A still further object is to provide an animal containment structure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
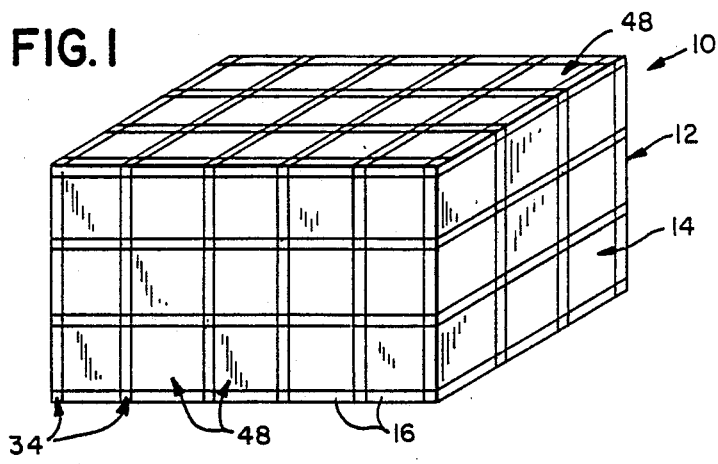
FIG. 1 is a diagrammatic perspective view of the instant invention.
Figure 4:
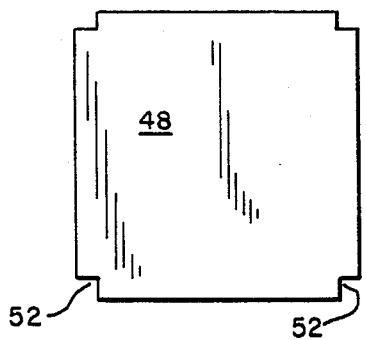
FIG. 4 is a plan view of a full typical panel of the invention.
Figure 5:
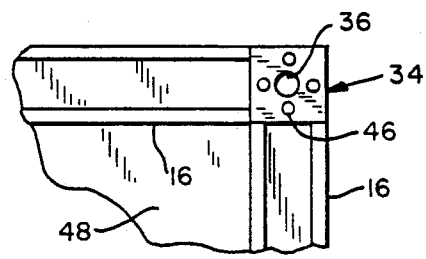
FIG. 5 is a fragmentary front elevational view of a single corner panel with a group of cooperative components.

Turning now descriptively to the drawings, in which like reference characters denote like elements throughout the several views, a structure 10 is shown to include an assembly 12 of a plurality of units 14 composed of a plurality of grooved rails 16 having end walls 18 integrally attached thereto. End walls 18 are provided with a recess 20 below one peripheral side for a purpose which will hereinafter be described, and a groove 22 through end walls 18 intersects with a round opening portion 24 that will also be later described.

Figure 3:
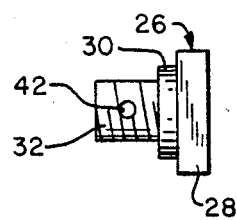
FIG. 3 is a side elevational view of a connector element of the invention.
Figure 2:
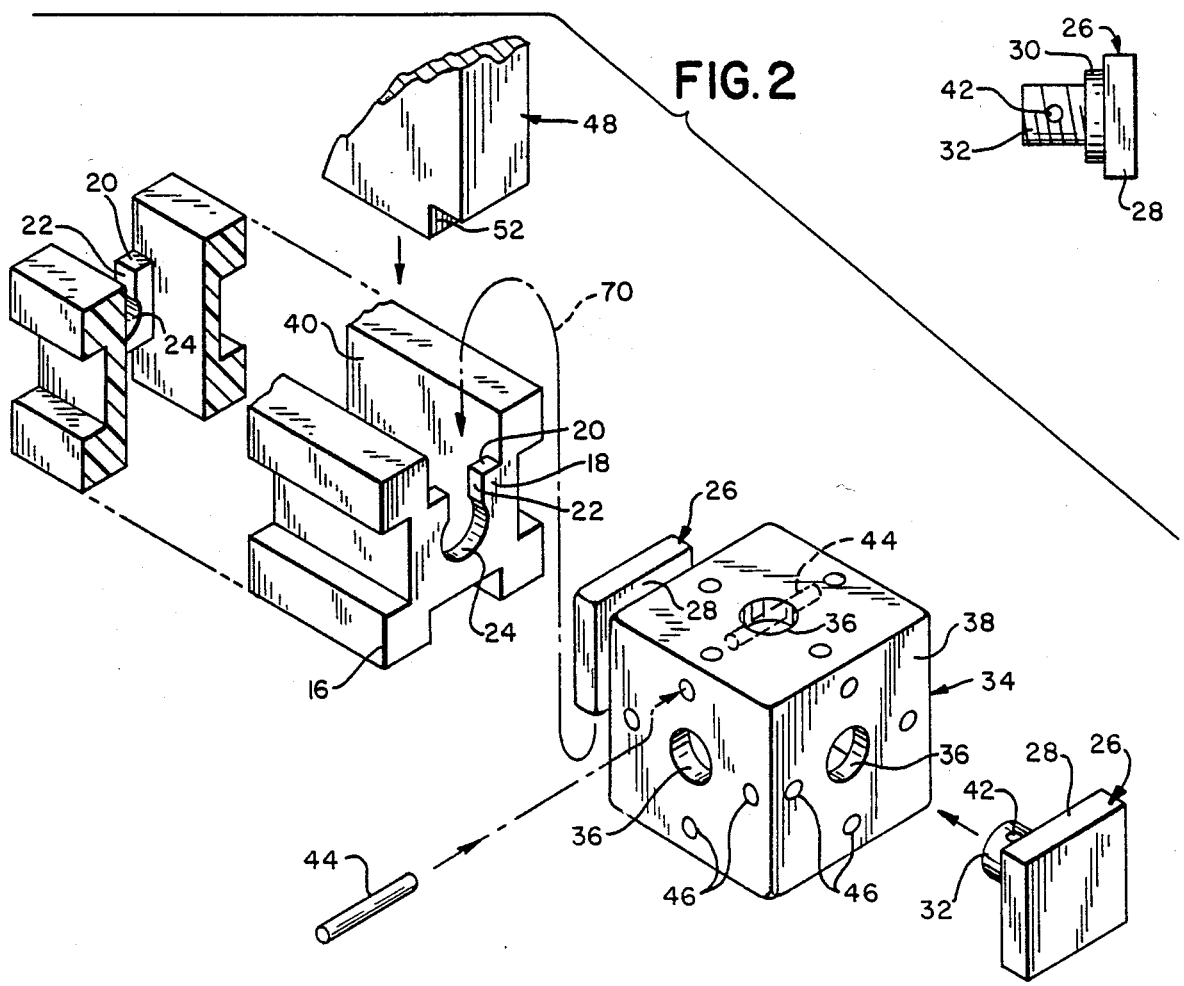
FIG. 2 is a fragmentary partially exploded isometric view of elements of the invention with a panel illustrated.

A plug 26 is provided in plurality and includes a square head 28 having a circular projection 30 integrally attached that serves as a spacer against end walls 18 when a shank 32 also integrally attached is received through an opening portion 24. Shank 32 may be optionally threaded as illustrated in FIG. 3, and a connector 34 is also provided in plurality and includes a central opening 36 through each side 38 for the reception of shanks 32 with projection 30 of the plugs 26.

Connectors 34 are cube in configuration and are hollow and may be fabricated of plastic material, as are the rails 16, and the heads 28 of plugs 26 are frictionally received in the grooves 40 of one side of rails 16. The projection 30 of the plugs 26 are also frictionally received in the opening portions 24 of the end walls 18.

The shanks 32 of plugs 26 inside a transverse opening 42 that frictionally receives a pin 44 and pin 44 is also received in any of the oppositely opposed openings 46 through connectors 34 and provides for locking the plugs 26 in the connectors 34.

Panels 48 are square in configuration and include notches 52 in each corner which engage with recess 20 of end walls 18, and the sides of the panels 48 frictionally engage with the inside surfaces of the groove 40.

It shall also be recognized that panels 48 may integrally include a, screen type panel, a transparent panel, a door assembly or any other of various specialized equipment as may be required for specific purposes of assembly 12.

In use, the plugs 26 are first assembled in the openings 36 of connector cubes 34 in what ever plurality is required depending whether the connector cube is being used as a corner piece, an edge piece, or an interior piece. Than the rails are forced onto the heads 28 as illustrated by arrow 70. Suitable panel components 48 are added as required as the structure takes shape.

It is to be further recognized that the instant invention lends itself to the construction of other structures for various purposes apart from that of animal containment, to mention just a few; as a toy; as partitions for offices, homes and department stores; as scaffoldings for construction work; etc.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An animal containment structure comprising:
   a plurality of similar panel mounting rails each formed in one piece with opposite ends, panel edge receiving channel sections extending between the ends, and end walls integrally joined to respective ends of respective rails to extend transversely of respective channel section portions, partly circular, laterally opening apertures formed in respective end walls;
   a plurality of similar connectors each formed with a plurality of pairs of opposite faces;
   a plurality of similar plugs having shanks and heads extending transversely of said shanks, each shank attached to the connector to extend from a selected face thereof with the respective head spaced apart from said face, the shanks being frictionally received by lateral movement thereof through the lateral openings in respective apertures so that respective heads are located in said opposite ends locked behind respective end walls thereby to lock the rails to the connectors providing interconnection of the rails extending in perpendicular directions to each other defining an open framework; and, panels received in selected of said channel sections providing closure means for the framework.

2. An animal containment structure as set forth in claim 1 wherein recessed surface portions are formed in each end wall and each panel has corners formed with notches having surfaces engaging with said recessed surface portions when the panel is mounted in the rails.

3. An animal containment structure as set forth in claim 2 wherein a spacing projection is provided on said shank at a location spaced from said head, said projection acting as a spacer between the head of the plug and an outside surface of said end wall.

4. An animal containment structure as set forth in claim 3 wherein shank receiving openings extend into respective faces of each connector, transverse openings intersect respective shank receiving openings and further openings extend transversely through each shank, each shank being secured in a respective shank receiving opening by a locking pin removably received in respective transverse openings in the connector and shank.

5. An animal containment structure as set forth in claim 3 wherein said head of said plug is frictionally received in a channel section portion of said rail.

6. An animal containment structure as set forth in claim 1 wherein said connectors are cubes, each face being formed with a plug receiving opening.

* * * * *